US011990980B2

(12) United States Patent
Fan et al.

(10) Patent No.: US 11,990,980 B2
(45) Date of Patent: May 21, 2024

(54) HANDOVER CONTROL METHOD AND DEVICE

(71) Applicant: DATANG MOBILE COMMUNICATIONS EQUIPMENT CO., LTD., Beijing (CN)

(72) Inventors: Jiangsheng Fan, Beijing (CN); Jing Liang, Beijing (CN)

(73) Assignee: Datang Mobile Communications Equipment Co., Ltd., Beijing (CN)

(*) Notice: Subject to any disclaimer, the term of this patent is extended or adjusted under 35 U.S.C. 154(b) by 402 days.

(21) Appl. No.: 17/416,786

(22) PCT Filed: Sep. 5, 2019

(86) PCT No.: PCT/CN2019/104588
§ 371 (c)(1),
(2) Date: Jun. 21, 2021

(87) PCT Pub. No.: WO2020/125069
PCT Pub. Date: Jun. 25, 2020

(65) Prior Publication Data
US 2022/0069902 A1    Mar. 3, 2022

(30) Foreign Application Priority Data
Dec. 21, 2018  (CN) .......................... 201811575205.7

(51) Int. Cl.
*H04B 7/185* (2006.01)
*H04W 36/00* (2009.01)
*H04W 36/32* (2009.01)
*H04W 36/36* (2009.01)
*H04W 84/06* (2009.01)

(52) U.S. Cl.
CPC ............... *H04B 7/18541* (2013.01); *H04W 36/008375* (2023.05); *H04W 36/32* (2013.01); *H04W 36/36* (2013.01); *H04W 84/06* (2013.01)

(58) Field of Classification Search
CPC . H04B 7/18541; H04W 36/245; H04W 36/36
See application file for complete search history.

(56) References Cited

U.S. PATENT DOCUMENTS 5,625,868 A  *  4/1997  Jan ...................... H04B 7/18539
                                              455/13.2
2013/0171995 A1* 7/2013 Fujishiro ........... H04W 28/0815
                                              455/422.1
(Continued)

FOREIGN PATENT DOCUMENTS

CN    101998557 A    3/2011
CN    105915304 A    8/2016
(Continued)

OTHER PUBLICATIONS

Thales, "NR-NTN: Chap 7.3—NR modifications to support the Non-Terrestrial Network deployment scenarios," 3GPP TSG RAN1 Meeting #93, R1-1807794, Busan, Korea (May 21-May 25, 2018).
(Continued)

*Primary Examiner* — Zhiren Qin
(74) *Attorney, Agent, or Firm* — Meunier Carlin & Curfman LLC

(57) ABSTRACT

The present disclosure relates to the field of wireless communication technology, and in particular, to a handover control method and device. The existing handover mechanism may cause the problem that too frequent handover measurement of a terminal increases the energy consumption of the terminal, negatively impacting the power saving of the terminal. A source satellite base station of the embodiments of the present disclosure receives auxiliary information reported by a terminal, determines at least one candidate satellite base station according to satellite base station orbital map information of the current region and the auxiliary information, and returns a handover command to the terminal according to the at least one candidate satellite base (Continued)

station, so that the terminal determines, according to the handover command, a target satellite base station to which the terminal is to be handed over, and is handed over from the source satellite base station to the target satellite base station. As the embodiments of the present disclosure provide a handover procedure for source satellite base station decision triggering, a terminal does not need to frequently measure the current serving base station and an adjacent base station, thereby simplifying the handover procedure and reducing the energy consumption of the terminal.

18 Claims, 6 Drawing Sheets

(56) References Cited

U.S. PATENT DOCUMENTS

| | | | |
|---|---|---|---|
| 2016/0323800 A1 | 11/2016 | Ulupinar et al. | |
| 2017/0041830 A1 | 2/2017 | Davis et al. | |
| 2017/0230104 A1* | 8/2017 | Purkayastha | H04B 7/18541 |
| 2017/0289822 A1 | 10/2017 | Hreha et al. | |
| 2018/0332507 A1* | 11/2018 | Fujishiro | H04J 11/00 |
| 2018/0359670 A1 | 12/2018 | Fang | |
| 2019/0320361 A1 | 10/2019 | Uchiyama et al. | |

FOREIGN PATENT DOCUMENTS

| | | |
|---|---|---|
| CN | 108112281 A | 6/2018 |
| CN | 108366400 A | 8/2018 |
| CN | 108737959 A | 11/2018 |
| WO | 2018/030007 A1 | 2/2018 |

OTHER PUBLICATIONS

International Search Report issued by the International Searching Authority (ISA/CN) in PCT Application No. PCT/CN2019/104588 dated Nov. 27, 2019. 4 pages, including English translation.

Thales, Nokia. Nokia Shanghai Bell, HNS. NR-NTN: Preliminary solutions for NR to support non-terrestrial. 3GPP TSG RAN Meeting #80. La Jolla, USA. Jun. 11-14, 2018. 15 pages.

* cited by examiner

HANDOVER CONTROL METHOD AND DEVICE

CROSS-REFERENCE OF RELATED APPLICATIONS

The present application is a US National Stage of International Application No. PCT/CN2019/104588, filed on Sep. 5, 2019, which claims priority from Chinese Patent Application No. 201811575205.7, filed with the China National Intellectual Property Administration on Dec. 21, 2018, and entitled "Handover Control Method and Device", which is hereby incorporated by reference in its entirety.

TECHNICAL FIELD

The disclosure relates to the field of wireless communication technologies and particularly to a handover control method and device.

BACKGROUND

The satellite Internet has the advantages of wide coverage and little impact from natural disasters and physical attacks. It can be deeply integrated with the terrestrial mobile communication network (5G network) to make up for the insufficient coverage of the terrestrial mobile network, and forms a converged network system with complementary advantages, close integration and stereo layering together with the terrestrial network, realizing the transmission and interaction of information on a global scale.

The satellite Internet includes geosynchronous satellite, medium earth orbit satellite and low earth orbit satellite. The low earth orbit satellite is characterized by being closer to the Earth's surface, the delay of communication with the terminal on the surface is moderate, while it also has the fast moving speed, large path loss, limited power on satellite and other characteristics.

Due to the fast moving speed of low and medium earth orbit satellites, even if a terminal does not move relative to the ground, the terminal will lose its effective connection with the current serving satellite in a short period, and the terminal needs to switch frequently between different serving satellites. In the cellular system, a connected terminal completes the handover from the current serving base station to another base station through the measurement reporting mechanism; wherein the measurement reporting mechanism of the terminal is the prerequisite for the serving base station to select a suitable target base station for the terminal. The terminal measures the signal quality of the neighboring-cell base station when the measurement trigger condition is met according to the measurement configuration of the network side and reports it to the serving base station in the form of measurement report, and the serving base station selects one or several suitable target base stations for the terminal to initiate a handover request process after considering the measurement report reported by the terminal comprehensively. In other words, in the cellular system, the handover procedure requires the terminal side to perform the auxiliary measurements.

However, in the high-speed mobile satellite communication network scenario, since the effective time of an area covered by low and medium earth orbit satellites is much shorter than the average time for a terminal to get service in a cell under the background of a cellular network, if applying the handover mechanism based on the terminal measurement report in the cellular network, the handover measurement process may be too frequent, which greatly increases the power consumption of the terminal and is not conducive to the power saving of the terminal.

SUMMARY

The disclosure provides a handover control method and device, so as to solve the problem that the existing handover mechanism may cause the handover measurement process of the terminal to be too frequent, which greatly increases the power consumption of the terminal and is not conducive to the power saving of the terminal.

Based on the foregoing problem, in a first aspect, an embodiment of the disclosure provides a handover control method, which includes:
  receiving, by a source satellite base station, auxiliary information reported by a terminal;
  determining, by the source satellite base station, at least one candidate satellite base station according to orbital map information of satellite base stations in a current region where the source satellite base station is located and the auxiliary information;
  returning, by the source satellite base station, a handover command to the terminal according to the at least one candidate satellite base station, to allow the terminal to determine a target satellite base station to be switched to according to the handover command and switches from the source satellite base station to the target satellite base station.

Optionally, the source satellite base station determines the orbital map information of satellite base stations in the current region in a following way:
  sending, by the source satellite base station, a request message for requesting the orbital map information of satellite base stations in the current region to a core network device;
  receiving, by the source satellite base station, the orbital map information of satellite base stations in the current region returned by the core network device.

Optionally, the auxiliary information includes some or all of:
  its own historical geographic location information recorded by the terminal, a moving speed of the terminal, and a moving direction of the terminal.

Optionally, determining, by the source satellite base station, at least one candidate satellite base station according to orbital map information of satellite base stations in a current region and the auxiliary information, includes:
  determining, by the source satellite base station, a motion state of the terminal according to the auxiliary information;
  determining, by the source satellite base station, the at least one candidate satellite base station according to the motion state of the terminal, the orbital map information of satellite base stations in the current region and the auxiliary information.

Optionally, motion states of the terminal include a first motion state in which a displacement change in unit time is not greater than a first preset value, and a second motion state in which a displacement change in unit time is greater than the first preset value.

Optionally, after the source satellite base station determines the motion state of the terminal according to the auxiliary information, the method further includes:
  sending, by the source satellite base station, indication information indicating the motion state of the terminal to the terminal;

when the motion state of the terminal is the second motion state, generating, by the source satellite base station, terminal-specific measurement configuration information according to the orbital map information of satellite base stations in the current region and the second motion state of the terminal, and sending the measurement configuration information to the terminal, so that the terminal performs neighboring satellite base station measurements according to the measurement configuration information.

Optionally, the auxiliary information further includes measurement information reported by the terminal.

Optionally, determining, by the source satellite base station, at least one candidate satellite base station to which the terminal can hand over according to the motion state of the terminal, includes:

when the motion state of the terminal is the first motion state, determining, by the source satellite base station, the at least one candidate satellite base station according to at least one of its own historical geographic location information recorded by the terminal, the moving speed of the terminal and the moving direction of the terminal as well as the orbital map information of satellite base stations in the current region where the source satellite base station is currently located;

when the motion state of the terminal is the second motion state, determining, by the source satellite base station, at least one candidate satellite base station according to at least one of its own historical geographic location information recorded by the terminal, the moving speed of the terminal, the moving direction of the terminal and the measurement information reported by the terminal as well as the orbital map information of satellite base stations in the current region where the source satellite base station is currently located.

Optionally, returning, by the source satellite base station, a handover command to the terminal according to the at least one candidate satellite base station, includes:

determining, by the source satellite base station, at least one candidate target satellite base station to which the terminal can hand over according to the at least one candidate satellite base station;

returning, by the source satellite base station, a handover command containing the at least one candidate target satellite base station to the terminal.

Optionally, determining, by the source satellite base station, at least one candidate target satellite base station to which the terminal can hand over according to the at least one candidate satellite base station, includes:

sending, by the source satellite base station, a handover request message to the at least one candidate satellite base station; wherein the handover request message includes at least one of latest location information reported by the terminal, moving speed, moving direction, and tracking area identification information;

receiving, by the source satellite base station, a handover confirmation message returned by the candidate satellite base station; wherein the handover confirmation message is sent after the candidate satellite base station determines that it can accept the handover request message according to its own load or a preset constraint;

taking, by the source satellite base station, one or more candidate satellite base stations that return handover confirmation messages as candidate target satellite base stations according to a local strategy.

Optionally, the handover confirmation message returned by the candidate satellite base station includes a first duration, wherein the first duration represents a remaining duration for the candidate satellite base station to arrive at a region where the terminal is located.

Optionally, returning, by the source satellite base station, a handover command containing at least one candidate target satellite base station to the terminal, includes:

returning, by the source satellite base station, a handover command containing a second duration corresponding to each candidate target satellite base station to the terminal so that the terminal performs handover according to the second duration; wherein the second duration represents a remaining duration for the candidate target satellite base station to arrive at the region where the terminal is located, and the second duration is not greater than the first duration; or returning, by the source satellite base station, the handover command containing at least one candidate target satellite base station to the terminal after a third duration from receiving the handover confirmation message.

In a second aspect, an embodiment of the disclosure provides a handover control method, which includes:

reporting, by a terminal, auxiliary information to a source satellite base station currently accessed, so that the source satellite base station determines at least one candidate satellite base station according to orbital map information of satellite base stations in a current region and the auxiliary information;

determining, by the terminal, a target satellite base station to be handed over according to a handover command returned by the source satellite base station, and switching from the source satellite base station to the target satellite base station.

Optionally, the auxiliary information includes some or all of:

its own historical geographic location information recorded by the terminal, a moving speed of the terminal, and a moving direction of the terminal.

Optionally, reporting, by the terminal, auxiliary information to a source satellite base station currently accessed, includes:

reporting, by the terminal, the auxiliary information to the source satellite base station currently accessed according to a preset first cycle; or adjusting, by the terminal, the preset first cycle according to the auxiliary information to get a second cycle, and reporting the auxiliary information to the source satellite base station currently accessed according to the second cycle; or reporting, by the terminal, the auxiliary information to the source satellite base station currently accessed when determining that a preset condition is satisfied according to the auxiliary information.

Optionally, the method further includes:

receiving, by the terminal, indication information indicating a motion state of the terminal sent by the source satellite base station; wherein motion states of the terminal include a first motion state in which a displacement change in unit time is not greater than a first preset value, and a second motion state in which a displacement change in unit time is greater than the first preset value;

when the motion state is the second motion state, receiving, by the terminal, measurement configuration information sent by the source satellite base station, and performing neighboring satellite base station measurements according to the measurement configuration information.

Optionally, the auxiliary information further includes measurement information reported by the terminal.

Optionally, after the terminal reports the auxiliary information to the source satellite base station and before determining the target satellite base station to be handed over according to the handover command returned by the source satellite base station, the method further includes:

receiving, by the terminal, a handover command containing at least one candidate target satellite base station returned by the source satellite base station.

Optionally, determining, by the terminal, the target satellite base station to be handed over according to the handover command returned by the source satellite base station, includes:

selecting, by the terminal, one of the at least one candidate target satellite base station contained in the handover command as the target satellite base station to be handed over.

Optionally, the handover command contains a second duration corresponding to each candidate target satellite base station; wherein the second duration represents a remaining duration for the candidate target satellite base station to arrive at the region where the terminal is located, and the second duration is not greater than the first duration;

switching, by the terminal, from the source satellite base station to the target satellite base station, includes:

switching, by the terminal, from the source satellite base station to the target satellite base station after the second duration from receiving the handover command; or switching, by the terminal, from the source satellite base station to the target satellite base station if it is determined that signal quality of the target satellite base station is greater than a preset threshold after the second duration from receiving the handover command; or triggering, by the terminal, handover from the source satellite base station to the target satellite base station in response to the handover command; or switching, by the terminal, from the source satellite base station to the target satellite base station if it is determined that signal quality of the target satellite base station is greater than a preset threshold after receiving the handover command.

In a third aspect, an embodiment of the disclosure provides an information acquisition method, including:

receiving, by a core network device, a request message sent by a source satellite base station;

sending, by the core network device, orbital map information of satellite base stations of a current region where the source satellite base station is located to the source satellite base station.

Optionally, the method further includes:

receiving, by the core network device, an instruction from a data management center;

updating, by the core network device, locally-stored orbital map information of satellite base stations according to the instruction.

In a fourth aspect, an embodiment of the disclosure provides a source satellite base station, including a processor, a memory and a transceiver;

wherein the processor is configured to read a program in the memory to:

receive auxiliary information reported by a terminal;

determine at least one candidate satellite base station according to orbital map information of satellite base stations in a current region where the source satellite base station is located and the auxiliary information;

return a handover command to the terminal according to the at least one candidate satellite base station, so that the terminal determines a target satellite base station to be handed over according to the handover command and switches from the source satellite base station to the target satellite base station.

In a fifth aspect, an embodiment of the disclosure provides a terminal, including a processor, a memory and a transceiver;

wherein the processor is configured to read a program in the memory to:

report auxiliary information to a source satellite base station currently accessed, so that the source satellite base station determines at least one candidate satellite base station according to orbital map information of satellite base stations in a current region where the source satellite base station is located and the auxiliary information;

determine a target satellite base station to be handed over according to a handover command returned by the source satellite base station, and switch from the source satellite base station to the target satellite base station.

In a sixth aspect, an embodiment of the disclosure provides a core network device, including a processor, a memory and a transceiver;

wherein the processor is configured to read a program in the memory to:

receive a request message sent by a source satellite base station;

send orbital map information of satellite base stations of a region where the source satellite base station is currently located to the source satellite base station.

In a seventh aspect, an embodiment of the disclosure provides a source satellite base station, including:

a first receiving module configured to receive auxiliary information reported by a terminal;

a first determining module configured to determine at least one candidate satellite base station according to orbital map information of satellite base stations in a current region where the source satellite base station is located and the auxiliary information;

a first sending module configured to return a handover command to the terminal according to the at least one candidate satellite base station, so that the terminal determines a target satellite base station to be handed over according to the handover command and switches from the source satellite base station to the target satellite base station.

In an eighth aspect, an embodiment of the disclosure provides a terminal, including:

a second sending module configured to report auxiliary information to a source satellite base station currently accessed, so that the source satellite base station determines at least one candidate satellite base station according to orbital map information of satellite base stations in a current region where the source satellite base station is located and the auxiliary information;

a second determining module configured to determine a target satellite base station to be handed over according to a handover command returned by the source satellite base station, and switch from the source satellite base station to the target satellite base station.

In a ninth aspect, an embodiment of the disclosure provides a core network device, including:

a second receiving module configured to receive a request message sent by a source satellite base station;

a third sending module configured to send orbital map information of satellite base stations of a current region where the source satellite base station is located to the source satellite base station.

In a tenth aspect, an embodiment of the disclosure provides a computer storable medium storing a computer program thereon, where the program, when executed by a processor, implements the steps of the method described in the above first aspect, or implements the steps of the method described in the above second aspect, or implements the steps of the method described in the above third aspect.

Since the terminal in the handover control system provided by the embodiment of the disclosure reports the auxiliary information to the source satellite base station, the source satellite base station can determine at least one candidate satellite base station according to the orbital map information of satellite base stations in the current region where the source satellite base station is located and the auxiliary information reported by the terminal; and the candidate satellite base station is the satellite base station that the terminal determines and may access during the next handover. After determining at least one candidate satellite base station, the source satellite base station sends a handover command to the terminal, and the terminal determines the target satellite base station to be handed over according to the received handover command and switches from the source satellite base station to the target satellite base station. The embodiments of the disclosure provide a handover process that the source satellite base station decides to trigger, which does not require the terminal to frequently measure the current serving base station and neighboring base stations, thereby simplifying the handover process and reducing the energy consumption of the terminal.

DETAILED DESCRIPTION OF THE EMBODIMENTS

In the following, some terms in the embodiments of the present application are explained so as to facilitate the understanding of those skilled in the art.

(1) In the embodiments of the present application, the nouns "network" and "system" are often used alternately, but those skilled in the art may understand the meaning thereof.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

The network architectures and service scenarios described in the embodiments of the disclosure are intended to illustrate the technical solutions of the embodiments of the disclosure more clearly, and do not constitute a limitation on the technical solutions provided in the embodiments of the disclosure. As can be known by those ordinary skilled in the art, with the evolution of network architectures and the emergence of new service scenarios, the technical solutions provided in the embodiments of the disclosure are also applicable to similar technical problems.

In order to make the objects, technical solutions and advantages of the disclosure clearer, the disclosure will be further illustrated below in details with reference to the accompanying figures. Obviously the described embodiments are merely a part of the embodiments of the disclosure but not all the embodiments. Based upon the embodiments in the disclosure, all of other embodiments obtained by those ordinary skilled in the art without creative work pertain to the protection scope of the disclosure.

The disclosure will be described below in detail with reference to the drawings.

Figure 1:
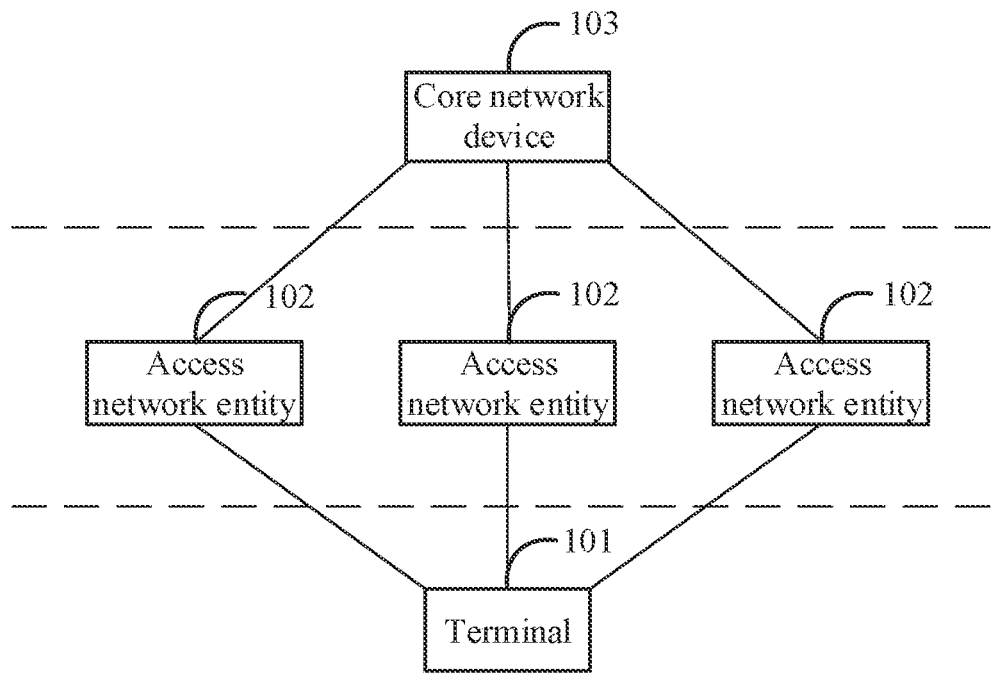
FIG. 1 shows a schematic diagram of a system architecture according to embodiments of the disclosure.

FIG. 1 exemplarily shows a schematic diagram of a system architecture applicable to the embodiments of the disclosure. As shown in FIG. 1, in the future 5G system architecture, a terminal 101 can communicate with the core network via an access network entity 102, and the terminal may refer to a UE, an access terminal, a user unit, a user station, a mobile radio station, a mobile station, a remote station, a remote terminal, a mobile device, a user terminal, a terminal, a wireless communication device, a user proxy, or a user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to a wireless modem, a vehicle-carried device, a wearable device, a terminal in the future 5G network, etc. For the convenience of description, FIG. 1 only illustrates one terminal. In an actual network, multiple terminals may coexist, which will not be repeated here.

The Access Network (AN) entity 102 may also be referred to as (Radio) Access Network ((R)AN) entity, which is collectively referred to as access network entity or (R)AN entity below, and is mainly responsible for providing a wireless connection for the terminal 101, ensuring the reliable transmission of uplink and downlink data of the terminal 101, and so on. The access network entity 102 may be a Next generation Node B (gNB) in the 5G system, or may be a Base Transceiver Station (BTS) in the Global System of Mobile communication (GSM) system or Code Division Multiple Access (CDMA), or may be a NodeB in the Wideband Code Division Multiple Access (WCDMA) system, or may be an evolutional Node B (eNB or eNodeB) in the Long Term Evolution (LTE) system, etc. Optionally, the access network entity in the embodiments of the disclosure is a satellite base station.

The core network device 103 is responsible for connecting the terminal device to different networks according to the call request or data request sent by the terminal device through the access network, as well as charging, mobility management, and so on. The core network device may be a 4G core network EPC (Evolved Packet Core) or a 5G core network device.

It should be noted that the foregoing system architecture is only an example of the system architecture applicable to the embodiments of the disclosure. Compared with the system architecture shown in FIG. 1, the system architecture applicable to the embodiments of the disclosure can also add other entities or reduce some entities.

The embodiments of the disclosure are applied to a satellite communication network scenario. In this scenario, the access network entity that provides services for the terminal is a satellite base station; and the satellite communication network scenario includes multiple satellite base stations, which move at high speed along the fixed orbits. The moving speed of the terminal is very low compared to that of the satellite base station. Whether the terminal is handed over depends mostly on the movement of the satellite base station rather than the movement of the terminal itself.

Moreover, due to the fixed orbit of the satellite base station, the coverage behavior of the satellite base station in the region where the terminal is located has regularity to conform to. After the source satellite base station accessed by the terminal obtains the orbital map information of satellite base stations, the source satellite base station can accurately determine the satellite base station passing through the region where the terminal is located at a certain time combined with the auxiliary information reported by the terminal, and complete the handover process under the decision of the source satellite base station. Thus there is no need for the terminal to frequently measure the current serving base station and neighboring base stations, thereby reducing the energy consumption of the terminal.

Figure 2:
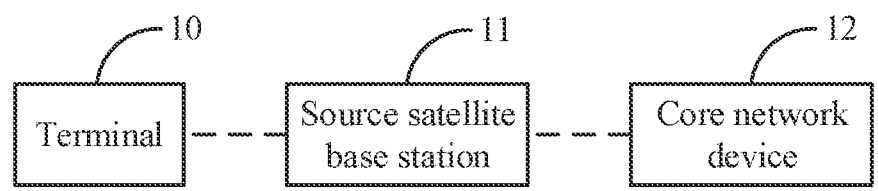
FIG. 2 shows a structural schematic diagram of a handover control system according to embodiments of the disclosure.

As shown in FIG. 2, a handover control system of an embodiment of the disclosure includes: a terminal 10, a source satellite base station 11 and a core network device 12.

Here, the source satellite base station is the current serving base station of the terminal.

The terminal 10 is configured to report the auxiliary information to the source satellite base station currently accessed, so that the source satellite base station determines at least one candidate satellite base station according to the orbital map information of satellite base stations in the current region and the auxiliary information; determine a target satellite base station to be handed over according to a handover command returned by the source satellite base station, and switch from the source satellite base station to the target satellite base station.

The source satellite base station 11 is configured to receive the auxiliary information reported by the terminal; determine at least one candidate satellite base station according to the orbital map information of satellite base stations in the current region and the auxiliary information; and return the handover command to the terminal according to the at least one candidate satellite base station, so that the terminal determines the target satellite base station to be handed over according to the handover command and switches from the source satellite base station to the target satellite base station.

The core network device 12 is configured to receive a request message sent by the source satellite base station; and send the orbital map information of satellite base stations in the current region where the source satellite base station is located to the source satellite base station.

Since the terminal in the handover control system provided by the embodiment of the disclosure reports the auxiliary information to the source satellite base station, the source satellite base station can determine at least one candidate satellite base station according to the orbital map information of satellite base stations in the current region and the auxiliary information reported by the terminal; and the candidate satellite base station is the satellite base station that the terminal determines and may access during the next handover. After determining at least one candidate satellite base station, the source satellite base station sends a handover command to the terminal, and the terminal determines the target satellite base station to be handed over according to the received handover command and switches from the source satellite base station to the target satellite base station. The embodiments of the disclosure provide a handover process that the source satellite base station decides to trigger, which does not require the terminal to frequently measure the current serving base station and neighboring base stations, thereby simplifying the handover process and reducing the energy consumption of the terminal.

Optionally, the source satellite base station determines the orbital map information of satellite base stations in the current region in a following way:

the source satellite base station sends a request message for requesting the orbital map information of satellite base stations in the current region to the core network device;

the core network device sends the orbital map information of satellite base stations in the current region where the source satellite base station is currently located to the source satellite base station.

Correspondingly, the source satellite base station receives the orbital map information of satellite base stations in the current region where the source satellite base station is currently located returned by the core network device.

The orbital map information of satellite base stations in the current region where the source satellite base station is currently located includes some or all of:

the information on the time when the satellite base station passes through the region where the source satellite base station is currently located, the altitude of the satellite base station, the moving speed and direction of the satellite base station, and the orbital inclination of the satellite base station.

It should be noted that the core network device stores the orbital map information of satellite base stations of all regions and sends the orbital map information of satellite base stations in the current region where the source satellite base station is currently located to the source satellite base station after receiving the request message sent by the source satellite base station; and the orbital map information of satellite base stations stored in the core network is not fixed, and the core network device can update the locally-stored orbital map information of satellite base stations.

In an implementation, the core network device updates the locally-stored orbital map information of satellite base stations in the following way:

the core network device receives an instruction of the data management center; and updates the locally-stored orbital map information of satellite base stations according to the instruction of the data management center.

Here, the auxiliary information reported by the terminal includes some or all of:

historical geographic location information of and recorded by the terminal, the moving speed of the terminal, and the moving direction of the terminal.

It should be noted that the terminal will record its own geographic location information, moving speed and moving direction; and optionally, the terminal periodically records some or all of the above information.

When the terminal reports the auxiliary information to the source satellite base station, an optional way is to report its own historical geographic location information, moving speed and moving direction recorded in the most recent period of time to the source satellite base station as auxiliary information.

Optionally, the terminal reports the auxiliary information to the source satellite base station in the following ways.

In a first way, the terminal reports the auxiliary information to the source satellite base station currently accessed according to a preset first cycle.

For example, the preset first cycle is T1, and then the terminal reports the auxiliary information periodically to the source satellite base station by taking T1 as cycle.

In a second way, the terminal determines a second cycle by adjusting the preset first cycle according to the auxiliary information, and reports the auxiliary information to the source satellite base station currently accessed according to the second cycle.

For example, the preset first cycle is T1, and the terminal adjusts (specifically, scales) the first cycle T1 according to the auxiliary information. For example, the first cycle T1 is adjusted to the second cycle T2, and then the terminal reports the auxiliary information periodically to the source satellite base station by taking T2 as cycle.

In a third way, the terminal reports the auxiliary information to the source satellite base station currently accessed when determining that a preset condition is satisfied according to the auxiliary information.

For example, the preset condition in the embodiment of the disclosure may be that there is a significant change in the geographic location or moving speed of the terminal; or the preset condition may be determining that the signal quality of the source satellite base station is lower than a preset value, or the preset condition is that there is a significant change in the geographic location or moving speed of the terminal and determining that the signal quality of the source satellite base station is lower than a preset value.

In an implementation, the embodiments of the disclosure determine at least one candidate satellite base station in the following way:

the source satellite base station determines the motion state of the terminal according to the auxiliary information;
the source satellite base station determines at least one candidate satellite base station according to the motion state of the terminal, the orbital map information of satellite base stations in the current region and the auxiliary information.

Here, the motion states of the terminal include a first motion state in which a displacement change in unit time is not greater than a first preset value, and a second motion state in which a displacement change in unit time is greater than the first preset value.

Specifically, the first motion state refers to that the moving speed of the terminal is lower than a second preset value;

or, the first motion state refers to that the moving speed of the terminal is higher than the second preset value but the displacement of the terminal during a period of time is not greater than a third preset value due to conditions such as circular motion of the terminal itself; when this condition is met, the terminal will be determined to be in the first motion state;

or, the first motion state means that the moving speed of the terminal is higher than the second preset value and the displacement of the terminal during a period of time is also greater than the third preset value but the terminal is always in the central area covered by the source satellite base station; when this condition is met, the terminal will be determined to be in the first motion state.

The second motion state refers to that the moving speed of the terminal is not lower than a fourth preset value;

or, the second motion state refers to that the moving speed of the terminal is lower than the fourth preset value and the terminal itself is in the edge area covered by the source satellite base station; when this condition is met, the terminal will be determined to be in the second motion state.

After determining the motion state of the terminal, the source satellite base station sends the indication information indicating the motion state of the terminal to the terminal.

In addition, when the source satellite base station determines that the motion state of the terminal is the second motion state, the source satellite base station needs to generate a terminal-specific measurement configuration.

Optionally, the source satellite base station determines the terminal-specific measurement configuration information in the following way:

the source satellite base station generates the terminal-specific measurement configuration information according to the orbital map information of satellite base stations in the current region and the second motion state of the terminal.

After determining the terminal-specific measurement configuration information, the source satellite base station sends the generated measurement configuration information to the terminal so that the terminal performs neighboring satellite base station measurements according to the measurement configuration information.

Optionally, the auxiliary information reported by the terminal to the source satellite base station in the embodiment of the disclosure further includes the measurement information reported by the terminal.

Here, the measurement information reported by the terminal is obtained by the terminal performing the neighboring satellite base station measurements according to the measurement configuration information.

It should be noted that the terminal performs the neighboring satellite base station measurements according to the measurement configuration information and reports the measurement information to the source satellite base station after determining that the reporting condition is met;

wherein the reporting condition may be the condition that the terminal reports the measurement information to the access base station in the prior art.

When the motion state of the terminal is the first motion state, the terminal does not perform any measurement of neighboring satellite base stations; and it should be noted that the terminal can measure the target satellite base station before the terminal determines to switch from the source satellite base station to the target satellite base station, so as to confirm whether the signal quality of the target satellite base station meets the condition.

When the motion state of the terminal is the second motion state, the terminal removes the restriction on the measurement of adjacent satellite base stations, and starts the same-frequency or adjacent-frequency measurement process immediately after the measurement condition is met.

Before the terminal performs the measurement or during the measurement process, if the terminal receives the new measurement configuration information contained in the reconfiguration message sent by the source satellite base station, the terminal uses the latest measurement configuration information received to complete the measurement process; otherwise, the terminal uses its own saved latest measurement configuration information to complete the measurement process, and reports the measurement information to the source satellite base station according to the latest measurement configuration requirement after completing the measurement.

In the embodiments of the disclosure, when the motion states of the terminal are different, the methods for the source satellite base station to determine the candidate satellite base station are also different, which will be respectively illustrated below.

1. The Motion State of the Terminal is the First Motion State.

The source satellite base station determines at least one candidate satellite base station according to at least one of its own historical geographic location information recorded by the terminal, the moving speed of the terminal and the moving direction of the terminal as well as the orbital map information of satellite base stations in the current region where the source satellite base station is currently located.

When the motion state of the terminal is the first motion state, the terminal does not perform neighboring base station measurements; so when the motion state of the terminal is the first motion state, the auxiliary information on which the source satellite base station relies when determining the candidate satellite base station includes at least one of its own historical geographic location information recorded by the terminal, the moving speed of the terminal and the moving direction of the terminal, and it is also necessary to determine the candidate satellite base station based on the orbital map information of satellite base stations in the current region where the source satellite base station is currently located.

2. The Motion State of the Terminal is the Second Motion State.

The source satellite base station determines at least one candidate satellite base station according to at least one of its own historical geographic location information recorded by the terminal, the moving speed of the terminal, the moving direction of the terminal and the measurement information reported by the terminal as well as the orbital map information of satellite base stations in the current region where the source satellite base station is located.

When the motion state of the terminal is the second motion state, the terminal needs to perform neighboring base station measurements; so when the motion state of the terminal is the second motion state, the auxiliary information on which the source satellite base station relies when determining the candidate satellite base station includes at least one of its own historical geographic location information recorded by the terminal, the moving speed of the terminal, the moving direction of the terminal and the measurement information reported by the terminal, and it is also necessary to determine the candidate satellite base station based on the orbital map information of satellite base stations in the current region where the source satellite base station is located.

After determining at least one candidate satellite base station, the source satellite base station returns a handover command to the terminal according to the at least one candidate satellite base station.

In an optional embodiment, the source satellite base station determines at least one candidate target satellite base station to which the terminal can hand over according to the at least one candidate satellite base station; and the source satellite base station returns a handover command containing at least one candidate target satellite base station to the terminal.

Optionally, the source satellite base station determines the candidate target satellite base station according to the following steps.

Step 1: the source satellite base station sends a handover request message to the at least one candidate satellite base station.

Specifically, when there are multiple candidate satellite base stations, the source satellite base station sends a handover request message to each candidate satellite base station through the inter-satellite interface.

Here, the handover request message includes at least one of the latest location information reported by the terminal, the moving speed, the moving direction, and the tracking area identification information.

Step 2: the source satellite base station receives a handover confirmation message returned by the candidate satellite base station; wherein the handover confirmation message is sent after the candidate satellite base station determines that it can accept the handover request message according to its own load or a preset constraint.

Specifically, after receiving the handover request message sent by the source satellite base station, the candidate satellite base station judges whether it can accept the terminal's access according to its own load situation or some preset constraints; and returns a handover confirmation message to the source satellite base station through the inter-satellite interface when determining that it can accept; or returns a handover rejection message to the source satellite base station through the inter-satellite interface when determining that the terminal cannot be accepted.

Step 3: take one or more candidate satellite base stations that return handover confirmation messages as candidate target satellite base stations according to the local strategy.

In an implementation, the source satellite base station can determine the candidate target satellite base stations based on multiple local strategies. For example, according to the effective service time of the satellite base station in the region, the satellite base station with the longer service time is given priority as the candidate target satellite base station; or according to the waiting time required before the terminal initiates the handover, the satellite base station with the shorter handover waiting time is given priority as the candidate target satellite base station, or considering the service time of the satellite base station and the handover waiting time of the terminal, the satellite base station with the moderate handover waiting time is selected as the candidate target satellite base station, so that not only the continuity of the service is ensured, but also the problem of too early handover or too late handover will not appear.

It should be noted that the source satellite base station takes one or more of the candidate satellite base stations that return handover confirmation messages as the candidate target satellite base stations: for example, the source satellite base station receives the handover confirmation messages returned from the candidate satellite base station A, candidate satellite base station B, candidate satellite base station C and candidate satellite base station D, and the source satellite base station takes the candidate base station B and candidate base station C as candidate target satellite base stations according to the local strategy.

Optionally, the handover confirmation message returned by the candidate satellite base station includes a first duration, wherein the first duration represents a remaining duration for the candidate satellite base station to arrive at a region where the terminal is located.

After determining the candidate target satellite base station, the source satellite base station sends a handover command containing the configuration information of the target satellite base station to the terminal.

Correspondingly, the terminal receives the handover command containing at least one candidate target satellite base station returned from the source satellite base station.

Optionally, the source satellite base station sends a handover command to the terminal in the following ways.

In a first way, the source satellite base station returns a handover command to the terminal, where the handover command includes all determined candidate target satellite base stations.

In an optional way, the source satellite base station receives the handover confirmation messages returned from multiple candidate satellite base stations; and forwards the handover confirmation message returned by the candidate target satellite base station to the terminal through a handover command after determining the candidate target satellite base station from the multiple candidate satellite base stations of which the handover confirmation messages have been received.

In a second way, the source satellite base station returns multiple handover commands to the terminal; wherein each handover command includes one or more candidate target satellite base stations.

It should be noted here that the total number of candidate target satellite base stations in the multiple handover commands is the number of candidate target satellite base stations determined by the source satellite base station.

In an optional embodiment, the source satellite base station receives the handover confirmation messages returned from multiple candidate satellite base stations; and forwards the handover confirmation messages returned by the candidate target satellite base stations to the terminal through multiple handover commands after determining the candidate target satellite base stations from the multiple candidate satellite base stations of which the handover confirmation messages have been received.

After receiving the handover command containing at least one candidate target satellite base station, the terminal determines the target satellite base station that needs to be handed over. Specifically, the terminal can determine the target satellite base station in the following way:

when one candidate target satellite base station is included in the handover command, the terminal takes the one candidate target satellite base station as the target satellite base station;

when multiple candidate target satellite base stations are included in the handover command, the terminal selects one of the multiple candidate target satellite base stations included in the handover command as the target satellite base station to be handed over.

Optionally, the handover command contains a second duration corresponding to each candidate target satellite base station; wherein the second duration represents a remaining duration for the candidate target satellite base station to arrive at the region where the terminal is located.

In an implementation, when multiple candidate target satellite base stations are included in the handover command, the terminal selects the target satellite base station from the candidate target satellite base stations in the following ways.

1. Select the Target Satellite Base Station According to the Distance.

The terminal selects the closest candidate target satellite base station from the multiple candidate target satellite base stations as the target satellite base station.

It should be noted here that if the handover fails during the process of handover to the target satellite base station, the terminal initiates the handover to the candidate satellite base station with the closest distance except the target satellite base station among the candidate target satellite base stations; and so on, which will not be described here in details.

2. Select the Target Satellite Base Station According to the Second Duration.

The terminal sorts from small to large according to the second duration corresponding to each candidate target satellite base station, and takes the candidate satellite base station corresponding to the smallest second duration as the target satellite base station.

It should be noted here that if the handover fails during the process of handover to the target satellite base station, the terminal initiates the handover to the candidate satellite base station with the smallest second duration except the target satellite base station among the candidate target satellite base stations; and so on, will not be described here in details.

When the source satellite base station returns the handover command to the terminal, the following ways may be specifically adopted.

In a first way, the source satellite base station returns a handover command containing a second duration corresponding to each candidate target satellite base station to the terminal so that the terminal performs handover according to the second duration; wherein the second duration represents a remaining duration for the candidate target satellite base station to arrive at the region where the terminal is located, and the second duration is not greater than the first duration.

Alternatively, in a second way, the source satellite base station returns the handover command containing at least one candidate target satellite base station to the terminal after a third duration from receiving the handover confirmation message.

For the first way, the terminal provides two methods for switching the source satellite base station to the target satellite base station.

1. The terminal switches from the source satellite base station to the target satellite base station after the second duration from receiving the handover command.

2. Alternatively, the terminal switches from the source satellite base station to the target satellite base station if it is determined that signal quality of the target satellite base station is greater than a preset threshold after the second duration from receiving the handover command.

Specifically, the terminal maintains a timer. After determining the target satellite base station according to the handover command, the terminal sets the duration of the timer to the second duration corresponding to the target satellite base station and starts this timer; upon time out of the timer, the second duration from receiving the handover command is determined to end.

For the second way, the terminal provides two methods for switching the source satellite base station to the target satellite base station.

1. The terminal triggers the handover from the source satellite base station to the target satellite base station in response to the handover command.

Specifically, after receiving the handover command, the terminal immediately switches from the source satellite base station to the target satellite base station in response to the handover command.

2. The terminal switches from the source satellite base station to the target satellite base station if it is determined that the signal quality of the target satellite base station is greater than a preset threshold after receiving the handover command.

Specifically, after receiving the handover command, the terminal judges whether the signal quality of the determined target satellite base station is greater than a preset threshold, and switches from the source satellite base station to the target satellite base station after determining that the signal quality of the target satellite base station is greater than the preset threshold.

Figure 3:
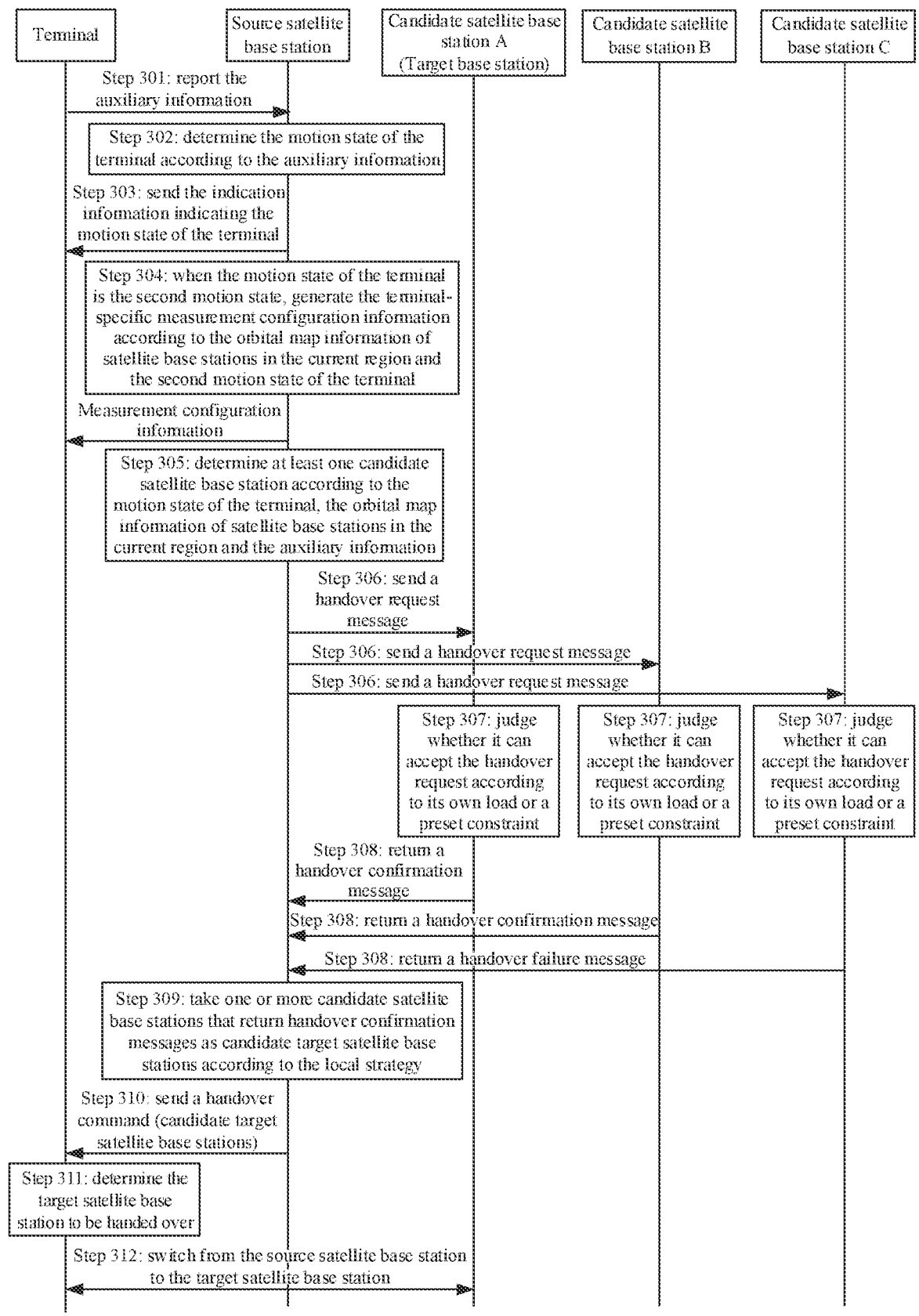
FIG. 3 shows a handover control flowchart according to embodiments of the disclosure.

As shown in FIG. 3, the switching control flowchart of an embodiment of the disclosure is shown.

Step 301: a terminal reports the auxiliary information to the source satellite base station currently accessed.

Here, the auxiliary information includes some or all of:
its own historical geographic location information recorded by the terminal, the moving speed of the terminal, the moving direction of the terminal, and the measurement information reported by the terminal.

Step 302: the source satellite base station determines the motion state of the terminal according to the auxiliary information.

Here, the motion states include a first motion state in which a displacement change in unit time is not greater than a first preset value, and a second motion state in which a displacement change in unit time is greater than the first preset value.

Step 303: the source satellite base station sends the indication information indicating the motion state of the terminal to the terminal.

Step 304: when the motion state of the terminal is the second motion state, the source satellite base station generates the terminal-specific measurement configuration information according to the orbital map information of satellite base stations in the current region and the second motion state of the terminal, and sends the measurement configuration information to the terminal.

It should be noted that the step 304 is an optional step, the step 304 is executed when the motion state of the terminal is the second motion state, and the execution order of the step 303 and step 304 is not distinguished, or the indication information in the step 303 and the measurement configuration information in the step 304 may be sent at the same time.

Step 305: the source satellite base station determines at least one candidate satellite base station according to the motion state of the terminal, the orbital map information of satellite base stations in the current region and the auxiliary information.

For example, a candidate satellite base station A, a candidate satellite base station B and a candidate satellite base station C are determined.

It should be noted that there is no sequential order between the step 305 and steps 303, 304.

Step 306: the source satellite base station sends a handover request message to at least one candidate satellite base station through the interface between the base stations.

Step 307: the candidate satellite base station judges whether it can accept the handover request according to its own load or a preset constraint.

Step 308: the candidate satellite base station returns a handover confirmation message to the source satellite base station after determining that it can receive the handover request; otherwise, returns a handover failure message.

For example, the candidate satellite base station A returns a handover confirmation message, the candidate satellite base station B returns a handover confirmation message, and the candidate satellite base station C returns a handover failure message.

Optionally, the handover confirmation message returned by the candidate satellite base station includes a first duration, wherein the first duration represents a remaining duration for the candidate satellite base station to arrive at a region where the terminal is located.

Step 309: the source satellite base station takes one or more candidate satellite base stations that return handover confirmation messages as candidate target satellite base stations according to the local strategy.

The source satellite base station takes the candidate satellite base station A and candidate satellite base station B as candidate target satellite base stations.

Step 310: the source satellite base station returns a handover command containing at least one candidate target satellite base station to the terminal.

Optionally, the handover command contains a second duration corresponding to the candidate target satellite base station, wherein the second duration represents a remaining duration for the candidate target satellite base station to arrive at the region where the terminal is located, and the second duration is not greater than the first duration.

Step 311: the terminal determines the target satellite base station to be handed over.

It is assumed that the determined target satellite base station is the candidate satellite base station A.

Step 312: the terminal switches from the source satellite base station to the target satellite base station.

Here, the way in which the terminal executes the handover process specifically refers to the above description.

Figure 4:
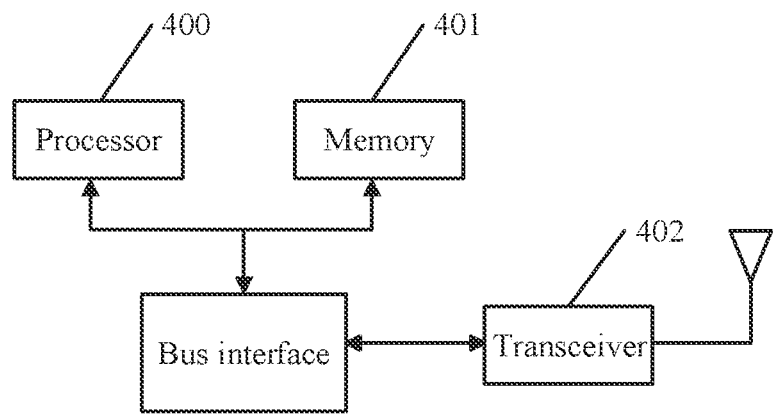
FIG. 4 shows a structural schematic diagram of a first source satellite base station according to embodiments of the disclosure.

As shown in FIG. 4, a first source satellite base station of an embodiment of the disclosure includes: a processor 400, a memory 401, a transceiver 402, and a bus interface.

The processor 400 is responsible for managing the bus architecture and general processing, and the memory 401 may store the data used by the processor 400 when performing the operations. The transceiver 403 is configured to receive and send the data under the control of the processor 400.

The bus architecture may include any numbers of interconnected buses and bridges, and specifically link various circuits of one or more processors represented by the processor 400 and the memory represented by the memory 401. The bus architecture may further link various other circuits such as peripheral device, voltage regulator and power management circuit, which are all well known in the art and thus will not be further described again herein. The bus interface provides an interface. The processor 400 is responsible for managing the bus architecture and general processing, and the memory 401 may store the data used by the processor 400 when performing the operations.

The procedure disclosed by the embodiment of the disclosure may be applied in the processor 400 or implemented by the processor 400. In the implementation process, each step of the signal processing flow may be completed by the integrated logic circuit of hardware in the processor 400 or the instruction in the form of software. The processor 400 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 401, and the processor 400 reads the information in the memory 401 and completes the steps of the signal processing flow in combination with its hardwares.

Specifically, the processor 400 is configured to read the program in the memory 401 and perform:
 receiving the auxiliary information reported by a terminal;
 determining at least one candidate satellite base station according to the orbital map information of satellite base stations in a current region where the source satellite base station is located and the auxiliary information;
 returning a handover command to the terminal according to the at least one candidate satellite base station, so that the terminal determines a target satellite base station to be handed over according to the handover command and switches from the source satellite base station to the target satellite base station.

Optionally, the processor 400 is specifically configured to perform:
 determining the orbital map information of satellite base stations in the current region in a following way:
 sending a request message for requesting the orbital map information of satellite base stations in the current region to a core network device;
 receiving the orbital map information of satellite base stations in the current region returned by the core network device.

Optionally, the auxiliary information includes some or all of:
 its own historical geographic location information recorded by the terminal, the moving speed of the terminal, and the moving direction of the terminal.

Optionally, the processor 400 is specifically configured to perform:
 determining the motion state of the terminal according to the auxiliary information;
 determining at least one candidate satellite base station according to the motion state of the terminal, the orbital map information of satellite base stations in the current region and the auxiliary information.

Optionally, the motion states of the terminal include a first motion state in which a displacement change in unit time is not greater than a first preset value, and a second motion state in which a displacement change in unit time is greater than the first preset value.

Optionally, the processor 400 is further configured to perform:
 sending the indication information indicating the motion state of the terminal to the terminal after determining the motion state of the terminal according to the auxiliary information;
 when the motion state of the terminal is the second motion state, generating the terminal-specific measurement configuration information according to the orbital map information of satellite base stations in the current region and the second motion state of the terminal, and sending the measurement configuration information to the terminal, so that the terminal performs neighboring satellite base station measurements according to the measurement configuration information.

Optionally, the auxiliary information further includes the measurement information reported by the terminal.

Optionally, the processor 400 is specifically configured to perform:
 when the motion state of the terminal is the first motion state, determining at least one candidate satellite base station according to at least one of its own historical geographic location information recorded by the terminal, the moving speed of the terminal and the moving direction of the terminal as well as the orbital map information of satellite base stations in the current region;
 when the motion state of the terminal is the second motion state, determining at least one candidate satellite base station according to at least one of its own historical geographic location information recorded by the terminal, the moving speed of the terminal, the moving direction of the terminal and the measurement information reported by the terminal as well as the orbital map information of satellite base stations in the current region where the source satellite base station is currently located.

Optionally, the processor 400 is specifically configured to perform:
 determining at least one candidate target satellite base station to which the terminal can hand over according to the at least one candidate satellite base station; and
 returning a handover command containing at least one candidate target satellite base station to the terminal.

Optionally, the processor 400 is specifically configured to perform:
 sending a handover request message to the at least one candidate satellite base station; wherein the handover request message includes at least one of the latest location information reported by the terminal, the moving speed, the moving direction, and the tracking area identification information;
 receiving a handover confirmation message returned by the candidate satellite base station; wherein the handover confirmation message is sent after the candidate satellite base station determines that it can accept the handover request message according to its own load or a preset constraint;

taking one or more candidate satellite base stations that return handover confirmation messages as candidate target satellite base stations according to a local strategy.

Optionally, the handover confirmation message returned by the candidate satellite base station includes a first duration, wherein the first duration represents a remaining duration for the candidate satellite base station to arrive at a region where the terminal is located.

Optionally, the processor 400 is specifically configured to perform:

returning a handover command containing a second duration corresponding to each candidate target satellite base station to the terminal so that the terminal performs handover according to the second duration; wherein the second duration represents a remaining duration for the candidate target satellite base station to arrive at the region where the terminal is located, and the second duration is not greater than the first duration; or returning the handover command containing at least one candidate target satellite base station to the terminal after a third duration from receiving the handover confirmation message.

Figure 5:
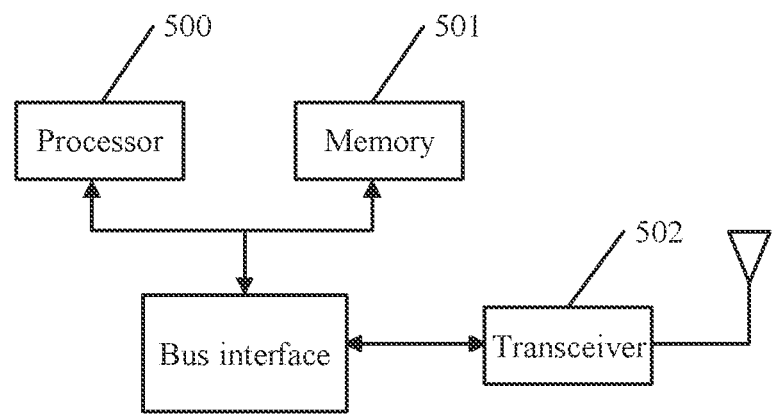
FIG. 5 shows a structural schematic diagram of a first terminal according to embodiments of the disclosure.

As shown in FIG. 5, a first terminal of an embodiment of the disclosure includes: a processor 500, a memory 501, a transceiver 502, and a bus interface.

The processor 500 is responsible for managing the bus architecture and general processing, and the memory 501 may store the data used by the processor 500 when performing the operations. The transceiver 503 is configured to receive and send the data under the control of the processor 500.

The bus architecture may include any numbers of interconnected buses and bridges, and specifically link various circuits of one or more processors represented by the processor 500 and the memory represented by the memory 501. The bus architecture may further link various other circuits such as peripheral device, voltage regulator and power management circuit, which are all well known in the art and thus will not be further described again herein. The bus interface provides an interface. The processor 500 is responsible for managing the bus architecture and general processing, and the memory 501 may store the data used by the processor 500 when performing the operations.

The procedure disclosed by the embodiment of the disclosure may be applied in the processor 500 or implemented by the processor 500. In the implementation process, each step of the signal processing flow may be completed by the integrated logic circuit of hardware in the processor 500 or the instruction in the form of software. The processor 500 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 501, and the processor 500 reads the information in the memory 501 and completes the steps of the signal processing flow in combination with its hardwares.

Specifically, the processor 500 is configured to read the program in the memory 501 to:

report the auxiliary information to a source satellite base station currently accessed, so that the source satellite base station determines at least one candidate satellite base station according to the orbital map information of satellite base stations in a current region where the source satellite base station is located and the auxiliary information;

determine a target satellite base station to be handed over according to a handover command returned by the source satellite base station, and switch from the source satellite base station to the target satellite base station.

Optionally, the auxiliary information includes some or all of:

its own historical geographic location information recorded by the terminal, the moving speed of the terminal, and the moving direction of the terminal.

Optionally, the processor 500 is specifically configured to:

report the auxiliary information to the source satellite base station currently accessed according to a preset first cycle; or adjust the preset first cycle according to the auxiliary information to get a second cycle, and report the auxiliary information to the source satellite base station currently accessed according to the second cycle; or report the auxiliary information to the source satellite base station currently accessed when determining that a preset condition is satisfied according to the auxiliary information.

Optionally, the processor 500 is further configured to:

receive the indication information indicating the motion state of the terminal sent by the source satellite base station; wherein the motion states of the terminal include a first motion state in which a displacement change in unit time is not greater than a first preset value, and a second motion state in which a displacement change in unit time is greater than the first preset value, when the motion state is the second motion state, receive measurement configuration information sent by the source satellite base station, and perform neighboring satellite base station measurements according to the measurement configuration information.

Optionally, the auxiliary information further includes the measurement information reported by the terminal.

Optionally, the processor 500 is further configured to:

receive a handover command containing at least one candidate target satellite base station returned by the source satellite base station after reporting the auxiliary information to the source satellite base station currently accessed and before determining the target satellite base station to be handed over according to the handover command returned by the source satellite base station.

Optionally, the processor 500 is specifically configured to:

select one of at least one candidate target satellite base station contained in the handover command as the target satellite base station to be handed over.

Optionally, the handover command contains a second duration corresponding to each candidate target satellite base station; wherein the second duration represents a remaining duration for the candidate target satellite base station to arrive at the region where the terminal is located, and the second duration is not greater than the first duration.

The processor 500 is specifically configured to:
switch from the source satellite base station to the target satellite base station after the second duration from receiving the handover command; or
switch from the source satellite base station to the target satellite base station if it is determined that signal quality of the target satellite base station is greater than a preset threshold after the second duration from receiving the handover command; or
trigger handover from the source satellite base station to the target satellite base station in response to the handover command; or
switch from the source satellite base station to the target satellite base station if it is determined that signal quality of the target satellite base station is greater than a preset threshold after receiving the handover command.

Figure 6:
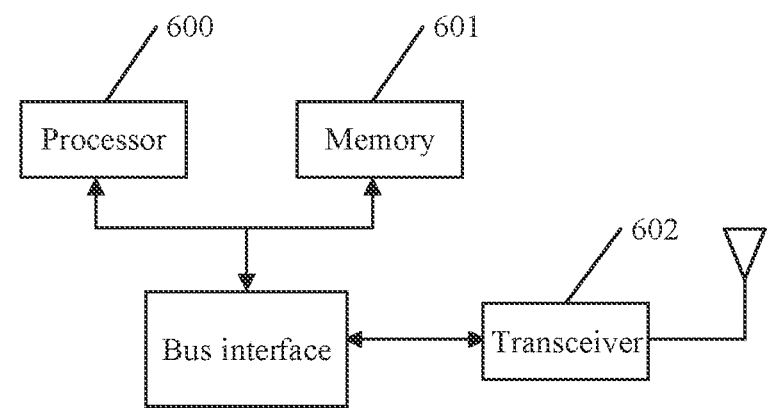
FIG. 6 shows a structural schematic diagram of a first core network device according to embodiments of the disclosure.

As shown in FIG. 6, a first core network device of an embodiment of the disclosure includes: a processor 600, a memory 601, a transceiver 602, and a bus interface.

The processor 600 is responsible for managing the bus architecture and general processing, and the memory 601 may store the data used by the processor 600 when performing the operations. The transceiver 603 is configured to receive and send the data under the control of the processor 600.

The bus architecture may include any numbers of interconnected buses and bridges, and specifically link various circuits of one or more processors represented by the processor 600 and the memory represented by the memory 601. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 when performing the operations.

The procedure disclosed by the embodiment of the disclosure may be applied in the processor 600 or implemented by the processor 600. In the implementation process, each step of the signal processing flow may be completed by the integrated logic circuit of hardware in the processor 600 or the instruction in the form of software. The processor 600 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the steps of the signal processing flow in combination with its hardware.

Specifically, the processor 600 is configured to read the program in the memory 601 and perform:
receive a request message sent by a source satellite base station;
send the orbital map information of satellite base stations of a current region where the source satellite base station is located to the source satellite base station.

Optionally, the processor 600 is further configured to:
receive an instruction from a data management center;
update the locally-stored orbital map information of satellite base stations according to the instruction.

Figure 7:
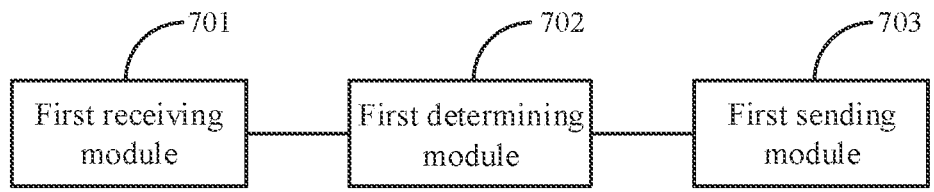
FIG. 7 shows a structural schematic diagram of a second source satellite base station according to embodiments of the disclosure.

As shown in FIG. 7, a second source satellite base station of an embodiment of the disclosure includes:
a first receiving module 701 configured to receive the auxiliary information reported by a terminal;
a first determining module 702 configured to determine at least one candidate satellite base station according to the orbital map information of satellite base stations in a current region and the auxiliary information;
a first sending module 703 configured to return a handover command to the terminal according to the at least one candidate satellite base station, so that the terminal determines a target satellite base station to be handed over according to the handover command and switches from the source satellite base station to the target satellite base station.

Optionally, the first determining module 702 is specifically configured to determine the orbital map information of satellite base stations in the current region in a following way:
sending a request message for requesting the orbital map information of satellite base stations in the current region to a core network device;
receiving the orbital map information of satellite base stations in the current region returned by the core network device.

Optionally, the auxiliary information includes some or all of:
its own historical geographic location information recorded by the terminal, the moving speed of the terminal, and the moving direction of the terminal.

Optionally, the first determining module 702 is specifically configured to:
determine the motion state of the terminal according to the auxiliary information;
determine at least one candidate satellite base station according to the motion state of the terminal, the orbital map information of satellite base stations in the current region and the auxiliary information.

Optionally, the motion states of the terminal include a first motion state in which a displacement change in unit time is not greater than a first preset value, and a second motion state in which a displacement change in unit time is greater than the first preset value.

Optionally, the first determining module 702 is further configured to:
send the indication information indicating the motion state of the terminal to the terminal after determining the motion state of the terminal according to the auxiliary information;
when the motion state of the terminal is the second motion state, generate the terminal-specific measurement configuration information according to the orbital map information of satellite base stations in the current region and the second motion state of the terminal, and send the measurement configuration information to the terminal, so that the terminal performs neighboring satellite base station measurements according to the measurement configuration information.

Optionally, the auxiliary information further includes the measurement information reported by the terminal.

Optionally, the first determining module 702 is specifically configured to:
  when the motion state of the terminal is the first motion state, determine at least one candidate satellite base station according to at least one of its own historical geographic location information recorded by the terminal, the moving speed of the terminal and the moving direction of the terminal as well as the orbital map information of satellite base stations in the current region where the source satellite base station is currently located;
  when the motion state of the terminal is the second motion state, determine at least one candidate satellite base station according to at least one of its own historical geographic location information recorded by the terminal, the moving speed of the terminal, the moving direction of the terminal and the measurement information reported by the terminal as well as the orbital map information of satellite base stations in the current region where the source satellite base station is currently located.

Optionally, the first sending module 703 is specifically configured to:
  determine at least one candidate target satellite base station to which the terminal can hand over according to the at least one candidate satellite base station; and return a handover command containing at least one candidate target satellite base station to the terminal.

Optionally, the first sending module 703 is specifically configured to:
  send a handover request message to the at least one candidate satellite base station; wherein the handover request message includes at least one of latest location information reported by the terminal, moving speed, moving direction, and tracking area identification information;
  receive a handover confirmation message returned by the candidate satellite base station; wherein the handover confirmation message is sent after the candidate satellite base station determines that it can accept the handover request message according to its own load or a preset constraint;
  take one or more candidate satellite base stations that return handover confirmation messages as candidate target satellite base stations according to a local strategy.

Optionally, the handover confirmation message returned by the candidate satellite base station includes a first duration, wherein the first duration represents a remaining duration for the candidate satellite base station to arrive at a region where the terminal is located.

Optionally, the first sending module 703 is specifically configured to:
  return a handover command containing a second duration corresponding to each candidate target satellite base station to the terminal so that the terminal performs handover according to the second duration; wherein the second duration represents a remaining duration for the candidate target satellite base station to arrive at the region where the terminal is located, and the second duration is not greater than the first duration; or
  return the handover command containing at least one candidate target satellite base station to the terminal after a third duration from receiving the handover confirmation message.

Figure 8:
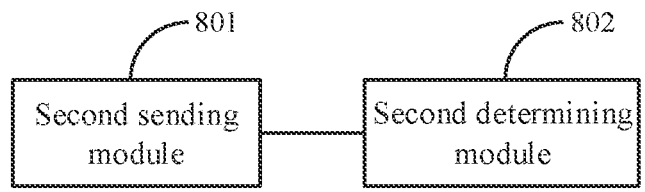
FIG. 8 shows a structural schematic diagram of a second terminal according to embodiments of the disclosure.

As shown in FIG. 8, a second terminal of an embodiment of the disclosure includes:
  a second sending module 801 configured to report the auxiliary information to a source satellite base station currently accessed, so that the source satellite base station determines at least one candidate satellite base station according to the orbital map information of satellite base stations in a current region where the source satellite base station is located and the auxiliary information;
  a second determining module 802 configured to determine a target satellite base station to be handed over according to a handover command returned by the source satellite base station, and switch from the source satellite base station to the target satellite base station.

Optionally, the auxiliary information includes some or all of:
  its own historical geographic location information recorded by the terminal, the moving speed of the terminal, and the moving direction of the terminal.

Optionally, the second sending module 801 is specifically configured to:
  report the auxiliary information to the source satellite base station currently accessed according to a preset first cycle; or
  adjust the preset first cycle according to the auxiliary information to get a second cycle, and report the auxiliary information to the source satellite base station according to the second cycle; or
  report the auxiliary information to the source satellite base station when determining that a preset condition is satisfied according to the auxiliary information.

Optionally, the second determining module 802 is further configured to:
  receive the indication information indicating a motion state of the terminal sent by the source satellite base station; wherein the motion states of the terminal include a first motion state in which a displacement change in unit time is not greater than a first preset value, and a second motion state in which a displacement change in unit time is greater than the first preset value;
  when the motion state is the second motion state, receive the measurement configuration information sent by the source satellite base station, and perform neighboring satellite base station measurements according to the measurement configuration information.

Optionally, the auxiliary information further includes the measurement information reported by the terminal.

Optionally, the second determining module 802 is further configured to:
  receive a handover command containing at least one candidate target satellite base station returned by the source satellite base station after reporting the auxiliary information to the source satellite base station currently accessed and before determining the target satellite base station to be handed over according to the handover command returned by the source satellite base station.

Optionally, the second determining module 802 is specifically configured to:
select one of at least one candidate target satellite base station contained in the handover command as the target satellite base station to be handed over.

Optionally, the handover command contains a second duration corresponding to each candidate target satellite base station; wherein the second duration represents a remaining duration for the candidate target satellite base station to arrive at the region where the terminal is located, and the second duration is not greater than the first duration;
the second determining module 802 is specifically configured to:
switch from the source satellite base station to the target satellite base station after the second duration from receiving the handover command; or
switch from the source satellite base station to the target satellite base station if it is determined that signal quality of the target satellite base station is greater than a preset threshold after the second duration from receiving the handover command; or
trigger handover from the source satellite base station to the target satellite base station in response to the handover command; or
switch from the source satellite base station to the target satellite base station if it is determined that signal quality of the target satellite base station is greater than a preset threshold after receiving the handover command.

Figure 9:
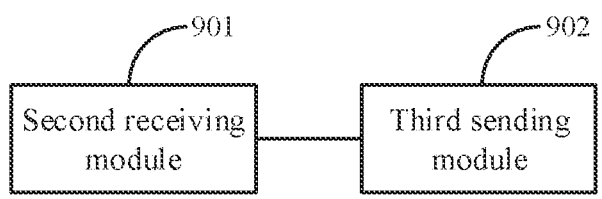
FIG. 9 shows a structural schematic diagram of a second core network device according to embodiments of the disclosure.

As shown in FIG. 9, a second core network device of an embodiment of the disclosure includes:
a second receiving module 901 configured to receive a request message sent by a source satellite base station;
a third sending module 902 configured to send the orbital map information of satellite base stations of a current region where the source satellite base station is located to the source satellite base station.

Optionally, the second receiving module 901 is further configured to:
receive an instruction from a data management center; and update the locally-stored orbital map information of satellite base stations according to the instruction from the data management center.

An embodiment of the disclosure provides a computer storable medium storing a computer program thereon, where the program, when executed by a processor, implements the steps of the handover control method on the source satellite base station side described above.

An embodiment of the disclosure provides a computer storable medium storing a computer program thereon, where the program, when executed by a processor, implements the steps of the handover control method on the terminal side described above.

An embodiment of the disclosure provides a computer storable medium storing a computer program thereon, where the program, when executed by a processor, implements the steps of the information acquisition method on the core network device side described above.

Based on the same inventive concept, an embodiment of the disclosure provides a first handover control method. Since this method corresponds to the source satellite base station in the handover control system of the embodiments of the disclosure and the principle of the method to solve the problem is similar to that of the system, the implementations of this method can refer to the implementations of the system, and the repeated description thereof will be omitted here.

Figure 10:
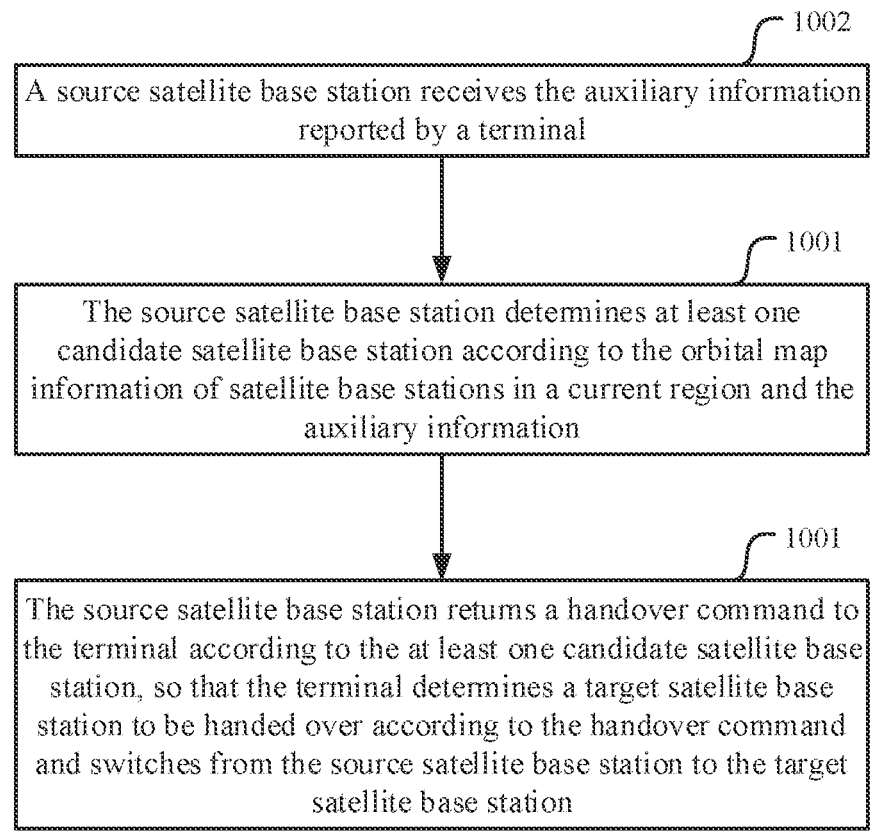
FIG. 10 shows a flowchart of a first handover control method according to embodiments of the disclosure.

As shown in FIG. 10, the first handover control method of the embodiment of the disclosure includes the following.
Step 1001: a source satellite base station receives the auxiliary information reported by a terminal.
Step 1002: the source satellite base station determines at least one candidate satellite base station according to the orbital map information of satellite base stations in a current region where the source satellite base station and the auxiliary information.
Step 1003: the source satellite base station returns a handover command to the terminal according to the at least one candidate satellite base station, so that the terminal determines a target satellite base station to be handed over according to the handover command and switches from the source satellite base station to the target satellite base station.

Optionally, the source satellite base station determines the orbital map information of satellite base stations in the current region in a following way:
the source satellite base station sends a request message for requesting the orbital map information of satellite base stations in the current region to a core network device;
the source satellite base station receives the orbital map information of satellite base stations in the current region returned by the core network device.

Optionally, the auxiliary information includes some or all of:
its own historical geographic location information recorded by the terminal, the moving speed of the terminal, and the moving direction of the terminal.

Optionally, the source satellite base station determines at least one candidate satellite base station according to the orbital map information of satellite base stations in the current region and the auxiliary information, including:
the source satellite base station determines the motion state of the terminal according to the auxiliary information;
the source satellite base station determines at least one candidate satellite base station according to the motion state of the terminal, the orbital map information of satellite base stations in the current region and the auxiliary information.

Optionally, the motion states of the terminal include a first motion state in which a displacement change in unit time is not greater than a first preset value, and a second motion state in which a displacement change in unit time is greater than the first preset value.

Optionally, after the source satellite base station determines the motion state of the terminal according to the auxiliary information, the method further includes:
the source satellite base station sends the indication information indicating the motion state of the terminal to the terminal;
when the motion state of the terminal is the second motion state, the source satellite base station generates the terminal-specific measurement configuration information according to the orbital map information of satellite base stations in the current region and the second motion state of the terminal, and sends the measurement configuration information to the terminal, so that the terminal performs neighboring satellite base station measurements according to the measurement configuration information.

Optionally, the auxiliary information further includes the measurement information reported by the terminal.

Optionally, the source satellite base station determines at least one candidate satellite base station to which the terminal can hand over according to the motion state of the terminal, including:

when the motion state of the terminal is the first motion state, the source satellite base station determines at least one candidate satellite base station according to at least one of its own historical geographic location information recorded by the terminal, the moving speed of the terminal and the moving direction of the terminal as well as the orbital map information of satellite base stations in the current region where the source satellite base station is currently located;

when the motion state of the terminal is the second motion state, the source satellite base station determines at least one candidate satellite base station according to at least one of its own historical geographic location information recorded by the terminal, the moving speed of the terminal, the moving direction of the terminal and the measurement information reported by the terminal as well as the orbital map information of satellite base stations in the current region where the source satellite base station is currently located.

Optionally, the source satellite base station returns a handover command to the terminal according to the at least one candidate satellite base station, including:

the source satellite base station determines at least one candidate target satellite base station to which the terminal can hand over according to the at least one candidate satellite base station;

the source satellite base station returns a handover command containing at least one candidate target satellite base station to the terminal.

Optionally, the source satellite base station determines at least one candidate target satellite base station to which the terminal can hand over according to the at least one candidate satellite base station, including:

the source satellite base station sends a handover request message to the at least one candidate satellite base station; wherein the handover request message includes at least one of the latest location information reported by the terminal, the moving speed, the moving direction, and the tracking area identification information;

the source satellite base station receives a handover confirmation message returned by the candidate satellite base station; wherein the handover confirmation message is sent after the candidate satellite base station determines that it can accept the handover request message according to its own load or a preset constraint;

the source satellite base station takes one or more candidate satellite base stations that return handover confirmation messages as candidate target satellite base stations according to a local strategy.

Optionally, the handover confirmation message returned by the candidate satellite base station includes a first duration, wherein the first duration represents a remaining duration for the candidate satellite base station to arrive at a region where the terminal is located.

Optionally, the source satellite base station returns a handover command containing at least one candidate target satellite base station to the terminal, including:

the source satellite base station returns a handover command containing a second duration corresponding to each candidate target satellite base station to the terminal so that the terminal performs handover according to the second duration; wherein the second duration represents a remaining duration for the candidate target satellite base station to arrive at the region where the terminal is located, and the second duration is not greater than the first duration; or the source satellite base station returns the handover command containing at least one candidate target satellite base station to the terminal after a third duration from receiving the handover confirmation message.

Based on the same inventive concept, an embodiment of the disclosure provides a second handover control method. Since this method corresponds to the terminal in the handover control system of the embodiments of the disclosure and the principle of the method to solve the problem is similar to that of the system, the implementations of this method can refer to the implementations of the system, and the repeated description thereof will be omitted here.

Figure 11:
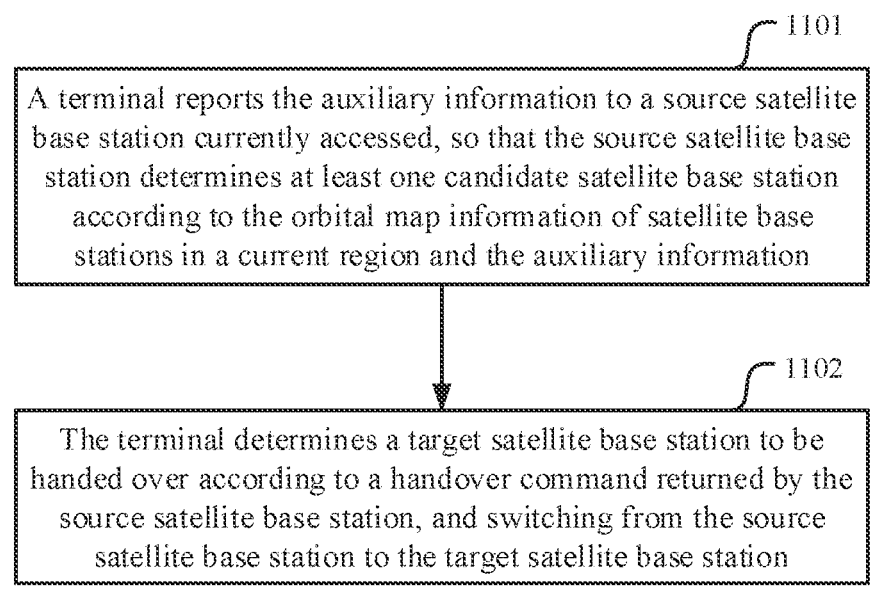
FIG. 11 shows a flowchart of a second handover control method according to embodiments of the disclosure.

As shown in FIG. 11, the second handover control method of the embodiment of the disclosure includes the following.

Step 1101: a terminal reports the auxiliary information to a source satellite base station currently accessed, so that the source satellite base station determines at least one candidate satellite base station according to the orbital map information of satellite base stations in a current region where the source satellite base station is located and the auxiliary information.

Step 1102: the terminal determines a target satellite base station to be handed over according to a handover command returned by the source satellite base station, and switching from the source satellite base station to the target satellite base station.

Optionally, the auxiliary information includes some or all of:

its own historical geographic location information recorded by the terminal, the moving speed of the terminal, and the moving direction of the terminal.

Optionally, the terminal reports the auxiliary information to the source satellite base station currently accessed, including:

the terminal reports the auxiliary information to the source satellite base station currently accessed according to a preset first cycle; or the terminal adjusts the preset first cycle according to the auxiliary information, and reports the auxiliary information to the source satellite base station currently accessed according to an adjusted second cycle; or the terminal reports the auxiliary information to the source satellite base station currently accessed when determining that a preset condition is satisfied according to the auxiliary information.

Optionally, the method further includes:

the terminal receives the indication information indicating the motion state of the terminal sent by the source satellite base station; wherein the motion states of the terminal include a first motion state in which a displacement change in unit time is not greater than a first preset value, and a second motion state in which a displacement change in unit time is greater than the first preset value;

when the motion state is the second motion state, the terminal receives the measurement configuration information sent by the source satellite base station, and performs neighboring satellite base station measurements according to the measurement configuration information.

Optionally, the auxiliary information further includes the measurement information reported by the terminal.

Optionally, after the terminal reports the auxiliary information to the source satellite base station currently accessed and before determining the target satellite base station to be handed over according to the handover command returned by the source satellite base station, the method further includes:

the terminal receives a handover command containing at least one candidate target satellite base station returned by the source satellite base station.

Optionally, the terminal determines the target satellite base station to be handed over according to the handover command returned by the source satellite base station, including:

the terminal selects one of at least one candidate target satellite base station contained in the handover command as the target satellite base station to be handed over.

Optionally, the handover command contains a second duration corresponding to each candidate target satellite base station; wherein the second duration represents a remaining duration for the candidate target satellite base station to arrive at the region where the terminal is located, and the second duration is not greater than the first duration;

the terminal switches from the source satellite base station to the target satellite base station, including:

the terminal switches from the source satellite base station to the target satellite base station after the second duration from receiving the handover command; or the terminal switches from the source satellite base station to the target satellite base station if it is determined that signal quality of the target satellite base station is greater than a preset threshold after the second duration from receiving the handover command; or the terminal triggers the handover from the source satellite base station to the target satellite base station in response to the handover command; or the terminal switches from the source satellite base station to the target satellite base station if it is determined that signal quality of the target satellite base station is greater than a preset threshold after receiving the handover command.

Based on the same inventive concept, an embodiment of the disclosure provides a first handover control method. Since this method corresponds to the core network device in the handover control system of the embodiments of the disclosure and the principle of the method to solve the problem is similar to that of the system, the implementations of this method can refer to the implementations of the system, and the repeated description thereof will be omitted here.

Figure 12:
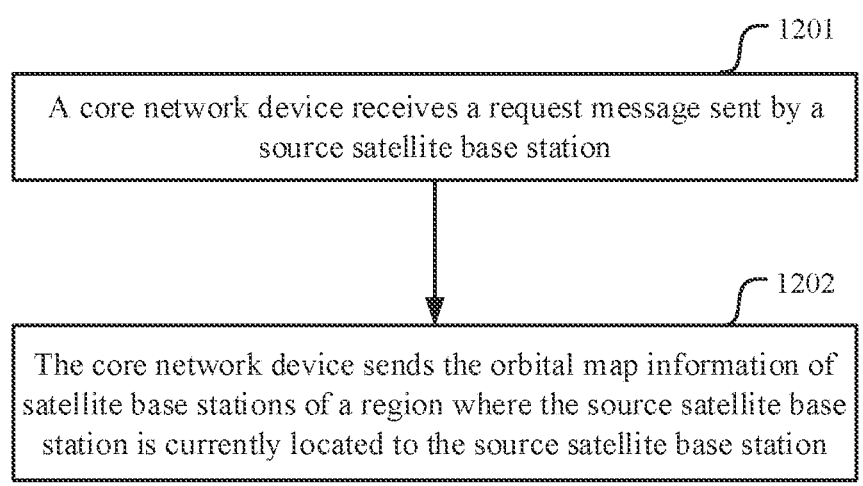
FIG. 12 shows a flowchart of a third handover control method of an embodiment of the disclosure.

As shown in FIG. 12, an information acquisition method of an embodiment of the disclosure includes the following.

Step 1201: a core network device receives a request message sent by a source satellite base station.

Step 1202: the core network device sends the orbital map information of satellite base stations of a region where the source satellite base station is currently located to the source satellite base station.

Optionally, the method further includes:
the core network device receives an instruction from a data management center;
the core network device updates the locally-stored orbital map information of satellite base stations according to the instruction.

It should be understood by those skilled in the art that the embodiments of the disclosure can be provided as methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the disclosure have been described, those skilled in the art can make additional alterations and modifications to these embodiments once they learn about the basic creative concepts. Thus the attached claims are intended to be interpreted to include the preferred embodiments as well as all the alterations and modifications falling within the scope of the disclosure.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A handover control method, comprising:
receiving, by a source satellite base station, auxiliary information reported by a terminal;
determining, by the source satellite base station, at least one candidate satellite base station according to orbital map information of satellite base stations in a current region where the source satellite base station is located and the auxiliary information;

sending, by the source satellite base station, a handover request message to the at least one candidate satellite base station; wherein the handover request message comprises at least one of latest location information reported by the terminal, moving speed, moving direction, and tracking area identification information;

receiving, by the source satellite base station, a handover confirmation message returned by a candidate satellite base station; wherein the handover confirmation message is sent after the candidate satellite base station confirms being capable of accepting the handover request message according to load of the candidate satellite base station or a preset constraint;

taking, by the source satellite base station, one or more candidate satellite base stations which return handover confirmation messages as at least one candidate target satellite base stations according to a local strategy;

returning, by the source satellite base station, a handover command containing the at least one candidate target satellite base station to the terminal, to allow the terminal to determine a target satellite base station to be switched to according to the handover command and switches from the source satellite base station to the target satellite base station.

2. The method of claim 1, wherein, the source satellite base station determines the orbital map information of satellite base stations in the current region in a following way:

sending, by the source satellite base station, a request message for requesting the orbital map information of satellite base stations in the current region to a core network device;

receiving, by the source satellite base station, the orbital map information of satellite base stations in the current region returned by the core network device.

3. The method of claim 1, wherein, the auxiliary information comprises some or all of:

historical geographic location information of and recorded by the terminal, a moving speed of the terminal, and a moving direction of the terminal.

4. The method of claim 3, wherein, determining, by the source satellite base station, at least one candidate satellite base station according to orbital map information of satellite base stations in the current region and the auxiliary information, comprises:

determining, by the source satellite base station, a motion state of the terminal according to the auxiliary information;

determining, by the source satellite base station, the at least one candidate satellite base station according to the motion state of the terminal, the orbital map information of satellite base stations in the current region and the auxiliary information;

wherein, motion states of the terminal comprise a first motion state in which a displacement change in unit time is not greater than a first preset value, and a second motion state in which a displacement change in unit time is greater than the first preset value.

5. The method of claim 4, wherein, after the source satellite base station determines the motion state of the terminal according to the auxiliary information, the method further comprises:

sending, by the source satellite base station, indication information indicating the motion state of the terminal to the terminal;

when the motion state of the terminal is the second motion state, generating, by the source satellite base station, terminal-specific measurement configuration information according to the orbital map information of satellite base stations in the current region and the second motion state of the terminal, and sending the measurement configuration information to the terminal, so that the terminal performs neighboring satellite base station measurements according to the measurement configuration information.

6. The method of claim 4, wherein, the auxiliary information further comprises measurement information reported by the terminal.

7. The method of claim 6, wherein, determining, by the source satellite base station, the at least one candidate satellite base station according to the motion state of the terminal, comprises:

when the motion state of the terminal is the first motion state, determining, by the source satellite base station, the at least one candidate satellite base station according to at least one of the historical geographic location information of and recorded by the terminal, the moving speed of the terminal and the moving direction of the terminal as well as the orbital map information of satellite base stations in the current region where the source satellite base station is currently located;

when the motion state of the terminal is the second motion state, determining, by the source satellite base station, at least one candidate satellite base station according to at least one of its own historical geographic location information recorded by the terminal, the moving speed of the terminal, the moving direction of the terminal and the measurement information reported by the terminal as well as the orbital map information of satellite base stations in the current region.

8. The method of claim 1, wherein, the handover confirmation message comprises a first duration, wherein the first duration represents a remaining duration for the candidate satellite base station to arrive at a region where the terminal is located.

9. The method of claim 8, wherein, returning, by the source satellite base station, a handover command containing the at least one candidate target satellite base station to the terminal, comprises:

returning, by the source satellite base station, a handover command containing a second duration corresponding to each candidate target satellite base station to the terminal so that the terminal performs handover according to the second duration; wherein the second duration represents a remaining duration for the candidate target satellite base station to arrive at the region where the terminal is located, and the second duration is not greater than the first duration; or returning, by the source satellite base station, the handover command containing the at least one candidate target satellite base station to the terminal after a third duration from receiving the handover confirmation message returned by the candidate satellite base station.

10. A handover control method, comprising:

reporting, by a terminal, auxiliary information to a source satellite base station currently accessed, to allow the source satellite base station to determine at least one candidate satellite base station according to orbital map information of satellite base stations in a current region where the source satellite base station is located and the auxiliary information, to send a handover request message to the at least one candidate satellite base station, and to take one or more candidate satellite base stations which return handover confirmation messages as at least one candidate target satellite base stations according to a local strategy; wherein the handover request message comprises at least one of latest location information reported by the terminal, moving speed, moving direction, and tracking area identification information, and the handover confirmation message is sent after the candidate satellite base station confirms being capable of accepting the handover request message according to load of the candidate satellite base station or a preset constraint;

receiving a handover command containing the least one candidate target satellite base station;

determining, by the terminal, a target satellite base station to be switched to according to the handover command returned by the source satellite base station, and switching from the source satellite base station to the target satellite base station.

11. The method of claim 10, wherein, the auxiliary information comprises some or all of:

historical geographic location information of and recorded by the terminal, a moving speed of the terminal, and a moving direction of the terminal; or wherein, reporting, by the terminal, auxiliary information to the source satellite base station, comprises:

reporting, by the terminal, the auxiliary information to the source satellite base station according to a preset first cycle; or adjusting, by the terminal, the preset first cycle according to the auxiliary information to obtain a second cycle, and reporting the auxiliary information to the source satellite base station according to the second cycle; or reporting, by the terminal, the auxiliary information to the source satellite base station when determining that a preset condition is satisfied according to the auxiliary information.

12. The method of claim 11, wherein, the method further comprises:

receiving, by the terminal, indication information indicating a motion state of the terminal sent by the source satellite base station; wherein motion states of the terminal comprise a first motion state in which a displacement change in unit time is not greater than a first preset value, and a second motion state in which a displacement change in unit time is greater than the first preset value;

when the motion state is the second motion state, receiving, by the terminal, measurement configuration information sent by the source satellite base station, and performing neighboring satellite base station measurements according to the measurement configuration information;

wherein, the auxiliary information further comprises measurement information reported by the terminal.

13. The method of claim 10, wherein, the handover command contains a second duration corresponding to each candidate target satellite base station; wherein the second duration represents a remaining duration for the candidate target satellite base station to arrive at a region where the terminal is located, and the second duration is not greater than the first duration;

switching, by the terminal, from the source satellite base station to the target satellite base station, comprises:

switching, by the terminal, from the source satellite base station to the target satellite base station after the second duration from receiving the handover command; or switching, by the terminal, from the source satellite base station to the target satellite base station if it is determined signal quality of the target satellite base station is greater than a preset threshold after the second duration from receiving the handover command; or triggering, by the terminal, handover from the source satellite base station to the target satellite base station in response to the handover command; or switching, by the terminal, from the source satellite base station to the target satellite base station if it is determined that signal quality of the target satellite base station is greater than a preset threshold after receiving the handover command.

14. A source satellite base station comprising a processor, a memory and a transceiver, wherein the processor is configured to read programs in the memory to perform:

receiving auxiliary information reported by a terminal;

determining at least one candidate satellite base station according to orbital map information of satellite base stations in a current region where the source satellite base station is located and the auxiliary information;

sending a handover request message to the at least one candidate satellite base station; wherein the handover request message comprises at least one of latest location information reported by the terminal, moving speed, moving direction, and tracking area identification information;

receiving a handover confirmation message returned by a candidate satellite base station; wherein the handover confirmation message is sent after the candidate satellite base station confirms being capable of accepting the handover request message according to load of the candidate satellite base station or a preset constraint;

taking one or more candidate satellite base stations which return handover confirmation messages as at least one candidate target satellite base stations according to a local strategy;

returning a handover command containing the at least one candidate target satellite base station to the terminal, to allow the terminal to determine a target satellite base station to be switched to according to the handover command and switches from the source satellite base station to the target satellite base station.

15. The source satellite base station of claim 14, wherein, the auxiliary information comprises some or all of:

historical geographic location information of and recorded by the terminal, a moving speed of the terminal, and a moving direction of the terminal.

16. The source satellite base station of claim 15, wherein, the processor is specifically configured to perform:

determining a motion state of the terminal according to the auxiliary information;

determining the at least one candidate satellite base station according to the motion state of the terminal, the orbital map information of satellite base stations in the current region and the auxiliary information;

wherein, motion states of the terminal comprise a first motion state in which a displacement change in unit time is not greater than a first preset value, and a second motion state in which a displacement change in unit time is greater than the first preset value.

17. The source satellite base station of claim 16, wherein, the processor is further configured to perform:
- sending indication information indicating the motion state of the terminal to the terminal after determining the motion state of the terminal according to the auxiliary information;
- when the motion state of the terminal is the second motion state, generating terminal-specific measurement configuration information according to the orbital map information of satellite base stations in the current region and the second motion state of the terminal, and sending the measurement configuration information to the terminal, so that the terminal performs neighboring satellite base station measurements according to the measurement configuration information.

18. A terminal comprising a processor, a memory and a transceiver,
- wherein the processor is configured to read programs in the memory to perform:
  - reporting auxiliary information to a source satellite base station currently accessed, to allow the source satellite base station to determine at least one candidate satellite base station according to orbital map information of satellite base stations in a current region where the source satellite base station is located and the auxiliary information, to send a handover request message to the at least one candidate satellite base station, and to take one or more candidate satellite base stations which return handover confirmation messages as at least one candidate target satellite base stations according to a local strategy; wherein the handover request message comprises at least one of latest location information reported by the terminal, moving speed, moving direction, and tracking area identification information, and the handover confirmation message is sent after the candidate satellite base station confirms being capable of accepting the handover request message according to load of the candidate satellite base station or a preset constraint;
  - receiving a handover command containing the least one candidate target satellite base station;
  - determining a target satellite base station to be switched to according to the handover command returned by the source satellite base station, and switching from the source satellite base station to the target satellite base station.

* * * * *